Nov. 3, 1931.     D. C. PRINCE     1,830,561
ELECTRIC POWER CONVERTING APPARATUS
Filed Sept. 2, 1930
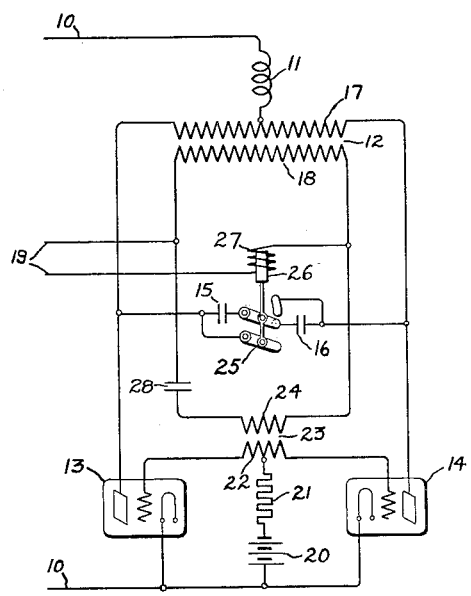
Inventor:
David C. Prince,
by Charles E. Fuller
His Attorney.

Patented Nov. 3, 1931

1,830,561

UNITED STATES PATENT OFFICE

DAVID C. PRINCE, OF SCHENECTADY, NEW YORK, ASSIGNOR TO GENERAL ELECTRIC COMPANY, A CORPORATION OF NEW YORK

ELECTRIC POWER CONVERTING APPARATUS

Application filed September 2, 1930. Serial No. 479,257.

My invention relates to electric power converting apparatus and more particularly to such converting apparatus for transmitting power from a direct current system to an alternating current system by means of electric valves.

Heretofore it has been proposed to use electric power converting apparatus including electric valves for supplying power to an alternating current motor. The type of apparatus most suitable for this purpose is that known in the art as the parallel type inverter, in which a pair of electric valves are connected between opposite terminals of an inductive winding and one side of a direct current supply, the other side of which is connected to the electrical midpoint of the inductive winding. This type of apparatus has the disadvantage, however, that its power output is considerably reduced when it is supplying power to an inductive load. Since many alternating current motors require large lagging currents in starting, this characteristic of the parallel inverter has rendered it unsuitable for many applications where it is required to furnish starting current for alternating current motors. This characteristic of the parallel inverters is due to the fact that an inductive load tends to discharge the commutating capacitor more quickly, with the result that the electric valves have less time to deionize and the maximum current which the inverter can deliver is thereby diminished. It would, of course, be possible to increase the size of the commutating capacitor to take care of the inductive load, but inasmuch as the capacitor is one of the most costly parts of the inverter circuit, it would not be economical to provide a capacitor having a sufficiently high rating to allow the inverter to supply large inductive loads.

It is an object of my invention to overcome the above mentioned disadvantage of electric power converting apparatus utilizing electric discharge devices and to provide such apparatus suitable for supplying power to alternating current motors or other load circuits drawing large lagging currents.

It is a further object of my invention to provide electric power converting apparatus using electric valves which will furnish a large lagging current for a time sufficient to start an alternating current motor to which it is furnishing power.

For a better understanding of my invention, together with other and further objects thereof, reference is had to the single figure of the accompanying drawing and its scope will be pointed out in the appended claims.

In carrying my invention into effect I make use of the well known parallel type inverter comprising a pair of electric valves connected in parallel across a source of direct current through an inductive winding provided with an electric midpoint which is connected to one of the direct current terminals. According to my invention I provide two capacitors normally connected in series between the valve circuits for commutating the current between them and provide means controlled by the flow of current in the output circuit for changing the connection of the capacitors from series to parallel. With the parallel connection the capacitor group has four times the capacitance and will supply four times as much charging current and hence the inverter will deliver approximately four times the wattless lagging current. Although, with this connection, the capacitors are operated under double their rated voltage, it has been found that this increase in voltage for a relatively short time, such as that required to start a motor, will not injure the capacitors.

Referring to the drawing I have shown diagrammatically a parallel inverter supplied with power from a direct current circuit 10 through a smoothing reactor 11. This inverter comprises a transformer 12, electric discharge devices 13 and 14 and commutating capacitors 15 and 16. The electric discharge devices 13 and 14 may be any of the several types well known in the art but I prefer to use vapor electric discharge devices in which the starting of the current in the device is controlled by the potential applied to the grid, but in which the current through the device can be interrupted only by reducing the anode potential below its critical value. The discharge devices 13 and 14 are connected between opposite terminals of the primary winding 17 of the transformer 12 and the negative side of the direct current circuit 10. The alternating current circuit is supplied from the secondary winding 18 of the transformer 12. The grid circuit for the discharge devices 13 and 14 includes the negative bias battery 20, the current limiting resistor 21, and opposite halves of the secondary winding 22 of a grid transformer 23, the primary winding 24 of which is connected across the alternating current circuit 19 through a phase advancing capacitor 28. A switch 25 is provided for changing the connection between the capacitors 15 and 16 from series to parallel. This switch 25 is operated by an electromagnet 26 provided with a coil 27 connected in series with the alternating current circuit 19.

In considering the operation of my invention, it will be assumed that the switch 25 is in the position indicated and that current from the direct current circuit can initially flow through the discharge device 13 and the left-hand portion of the primary winding 17 of the transformer 12. The primary winding 17 acts as an auto-transformer and a potential approximately twice that of the direct current circuit will be induced in the right hand terminal. This full potential of the primary winding 17 is impressed upon the capacitors 15 and 16 in series. When the polarity of the grid potential reverses so that the device 14 becomes conducting, the full potential of the capacitors 15 and 16 is impressed, through the device 14, between the cathode and anode of the device 13. This potential is in a direction opposite to that which causes a flow of current through the device 13 and many times its magnitude so that the current in the discharge device 13 is instantly interrupted. By the time the capacitors 15 and 16 have completely discharged, the grid of the device 13 is again negative to prevent restarting of the current in this device. However, unless the space between the cathode and the anode of the device 13 has become deionized during the period that the capacitors 15 and 16 are discharging, the grid of this device 13 is not effective to prevent a restarting of the current between its anode and cathode. Obviously, the larger the capacitors 15 and 16, the greater the time that they will require to completely discharge and the longer the time which the device 13 will have to become completely deionized. Since an inductive load aids in discharging the capacitors 15 and 16, it is obvious that with an inductive load the devices 13 and 14 will be given a shorter time to deionize, with the result that a smaller current can be handled through these devices without their breaking down. According to my invention, when a large current is drawn in the alternating current circuit 19, as by starting an alternating current motor or any other power consuming device, a series coil 27 energizes the electromagnet 26 to operate the switch 25 to its upper position, which connects the capacitors 15 and 16 in parallel. With this parallel connection, approximately four times the charging current is supplied, as explained above, with the result that for the same load, or ionization of the valves 13 and 14, these valves are given a considerably longer time to become deionized, with the result that they can handle a very much larger current.

It will be noted that the upper pole of the switch 25 engages the upper stationary contact before leaving the lower contact thus insuring that the transfer from series to parallel connection is effected smoothly and without opening the capacitor circuit, so that the changeover may be made at any time without interrupting the operation of the apparatus. With the switch 25 in an intermediate position, engaging both of the sationary contacts, it will be seen that the capacitor 16 is short circuited so that the capacity of the circuit is twice that with a series connection. It will be obvious to those skilled in the art that advantage may be taken of this fact by providing the electromagnet 26 with an intermediate operating position. With such an arrangement it would be necessary to apply double voltage to only one of the series capacitors for moderate overloads or for moderate lagging currents. Obviously, when the current in the load circuit drops to normal value, the electromagnet 26 is less strongly attracted by its coil 27 and the switch 25 is operated to its initial position, in which the capacitors 15 and 16 are connected in series.

While I have shown an arrangement for operating the switch 25 in response to the magnitude of the current flowing in the alternating current circuit 19, it will be obvious to those skilled in the art that this switch may be operated in response to the power factor of the circuit, the voltage of the circuit, or any other electrical characteristic of the circuit which serves as an indication that the inverter is reaching its maximum current output. It will also be obvious to those skilled in the art that, while I have illustrated my invention as applied to a single phase inverter, it is equally applicable to a polyphase inverter utilizing electric valves and commutating capacitors.

While I have shown and described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:—

1. The combination with a system for transmitting electrical energy from a direct current circuit to an alternating current circuit including an inductive winding and a plurality of electric valves, of a plurality of capacitors, normally serially connected between said valve circuits, and means responsive to an abnormal electrical condition of said system to connect said capacitors in parallel for the duration of said abnormal condition.

2. The combination with a system for transmitting electrical energy from a direct current circuit to an alternating current circuit including an inductive winding and a plurality of electric valves, of a plurality of capacitors, normally serially connected between said valve circuits, and means for connecting said capacitors in parallel when the load current rises above a predetermined value.

3. The combination with a system for transmitting electrical energy from a direct current circuit to an alternating current circuit including an inductive winding and a plurality of electric valves of a plurality of capacitors normally serially connected between said valve circuits, switching means for changing the connection of said capacitors from series to parallel and electromagnetic operating means for said switching means, energized by the load current of the system to connect said capacitors in parallel when the load current reaches a predetermined value.

4. The combination with a system for transmitting electrical energy from a direct current circuit to an alternating current circuit including an inductive winding and a plurality of electric valves, of a plurality of capacitors normally serially connected between said valve circuits and means responsive to an electrical condition of said system to connect said capacitors in parallel without opening the capacitor circuit.

5. The combination with a system for transmitting electrical energy from a direct current circuit to an alternating current circuit including an inductive winding and a plurality of electric valves, of a plurality of capacitors normally serially connected between said valve circuit, means responsive to an electrical condition of said system to short circuit one of said capacitors and means responsive to a second electrical condition of said system to connect said capacitors in parallel.

In witness whereof, I have hereunto set my hand this 29th day of August, 1930.

DAVID C. PRINCE.